United States Patent
Vollebregt

Patent Number: 5,513,470
Date of Patent: May 7, 1996

[54] DRAINAGE SYSTEM FOR RETRACTABLE ROOF

[75] Inventor: Richard Vollebregt, Brantford, Canada

[73] Assignee: Cravo Equipment Ltd., Brantford, Canada

[21] Appl. No.: 85,312

[22] Filed: Jun. 29, 1993

Related U.S. Application Data

[63] Continuation-in-part of Ser. No. 905,781, Jun. 29, 1992.

[51] Int. Cl.⁶ .............................. E04B 7/16; E04B 7/12; E04D 13/064
[52] U.S. Cl. .................. 52/13; 52/18; 52/63; 52/66; 160/84.08
[58] Field of Search .................... 52/11, 13, 14, 52/18, 63, 66; 160/1, 7, 84.1 R, 84.1 E, 84.01, 84.04, 84.05, 84.06, 84.08

[56] References Cited

U.S. PATENT DOCUMENTS

| | | |
|---|---|---|
| 870,917 | 11/1907 | Weston . |
| 1,022,948 | 4/1912 | Jacobs . |
| 1,930,750 | 10/1933 | Hart .............................................. 52/14 |
| 2,118,474 | 5/1938 | Morton ............................... 160/84.1 E |
| 2,384,719 | 9/1945 | Anderson . |
| 2,393,055 | 1/1946 | Negrijn . |
| 3,100,950 | 8/1963 | Heuer . |
| 3,140,563 | 7/1964 | Allen . |
| 3,289,360 | 12/1966 | Gartner . |
| 3,344,564 | 10/1967 | Siegal . |
| 3,911,632 | 10/1975 | Bryfogle et al. . |
| 3,964,781 | 6/1976 | Fenton ................................ 160/84.1 E |
| 4,117,636 | 10/1978 | Smith . |
| 4,173,101 | 11/1979 | Van Wingerden . |
| 4,565,230 | 1/1986 | Van Rijn et al. . |
| 4,837,990 | 6/1989 | Peleg . |
| 4,944,551 | 7/1990 | Hardy, Jr. ............................ 160/84.1 E |

FOREIGN PATENT DOCUMENTS

| | | |
|---|---|---|
| 948730 | 1/1949 | France . |
| 2101506 | 3/1972 | France . |
| 2125127 | 12/1971 | Germany . |
| 3633389 | 4/1988 | Germany ..................................... 52/18 |
| 281999 | 12/1964 | Netherlands . |
| 8902219 | 12/1971 | Netherlands . |
| 662629 | 12/1951 | United Kingdom ........................ 52/13 |
| 9107081 | 5/1991 | WIPO .......................................... 52/14 |

Primary Examiner—Michael Safavi
Attorney, Agent, or Firm—Baker & Daniels

[57] ABSTRACT

A roof structure to protect a crop growing area includes a retractable roof membrane or curtain that defines pitched sections of the roof. The membrane extends across the valley between pitched sections and apertures are provided in the membrane to allow water to pass through the membrane. A gutter is disposed in the valley beneath the apertures to collect water and discharge it away from the crop growing area.

19 Claims, 6 Drawing Sheets

DRAINAGE SYSTEM FOR RETRACTABLE ROOF

This application is a continuation-in-part of application Ser. No. 07/905,781 filed Jun. 29, 1992.

The present invention relates to a roof and in particular to a roof suitable for protecting crops from adverse climatic conditions.

It is well known to provide protection for crops against adverse climatic conditions by utilizing either a greenhouse structure or by using a curtain arrangement. The greenhouse structure is well known and utilizes a fixed frame that is glazed to allow light to pass through to the growing area and to protect the plants within the greenhouse from the cold. A more recent development has been a curtain structure in which large curtains of material may be deployed across the crop to provide shade during the day and to prevent heat loss during the night. The curtain structures are more economical than greenhouses in that they essentially utilize the ambient environment for growing and merely protect against extremes. On the other hand, the greenhouse structure will provide an artificial climate for plants and will frequently require heating and cooling equipment to maintain a desired environment within the greenhouse.

A conventional glazed greenhouse structure is capable of isolating the crop from the ambient conditions and so protects the crop from excessive cold or rainfall which may be disastrous to newly sown crops. However, greenhouses are expensive to install, particularly where the protection they provide is only required occasionally and suffer from excessive heat gain during sunny weather. Curtain structures, on the other hand, are more economical to build and maintain and may provide a variety of protection to the crops by using different curtain materials. However, when the curtain structure is to be utilized as a greenhouse, the curtain is effective to control air flow into and out of the structure. Excessive exchange of air leads to high energy consumption for either heating or cooling and renders the operation of the greenhouse more expensive. The curtain therefore has to be able to cover all of the growing area in a relatively airtight manner.

Some difficulty has been experienced with the curtain structures previously utilized during heavy rain. To avoid the build-up of water on the curtain, the curtain has been segmented so that the water simply passes through the adjacent edges of the curtain onto the crop. Alternatively, a water-permeable material has been used that allows the rainfall to fall directly onto the crop. In heavy rainfall, however, the amount of water shed by the roof is significant and can cause washout of the newly-sown crop where the water is shed. Moreover, gaps between adjacent curtains do not permit effective sealing of the air within the structure. Similarly, water permeating through the fabric can lead to excess rainfall on the growing area and materials that are capable of passing flow rates associated with heavy rainfall are not generally effective to provide the necessary control of the environment within the structure. For this reason, conventional greenhouse structures have been retained in areas where heavy rainfall may be expected and newly sown crops are to be protected.

It is an object of the present invention to provide a roof structure which permits the use of a curtain system and obviates or mitigates the above disadvantages.

According to the present invention, there is provided a roof comprising a pair of spaced parallel rafter assemblies each having a pair of oppositely directed rafters diverging upwardly from a valley to a respective peak, a flexible roof membrane extending between said rafter assemblies and from one peak through said valley to an adjacent peak, said membrane including an aperture located in the portion of the membrane extending through said valley, and a water collector disposed beneath said aperture to collect water shed from said membrane.

By providing apertures in the portion of the membrane extending through the valley and collecting water that passes through that aperture, the discharge of water may be controlled and washout of the crop avoided.

It is preferred that the membrane is retractable allowing full advantage to be taken of favourable climatic conditions, in which case the continuity of the membrane facilitates deployment and retraction of the curtain.

It is also preferred that the apertures are formed as slits in the membrane extending parallel to the valley so that the apertures remain closed until the weight of water forces the edges of the apertures apart.

An embodiment of the invention will now be described by way of example only with reference to the accompanying drawing, in which

FIG. 2 is a plan view of a portion of the roof structure shown in FIG. 1 with FIG. 2a showing an alternative embodiment of a portion of the roof structure shown in FIG. 2;

Figure 1:
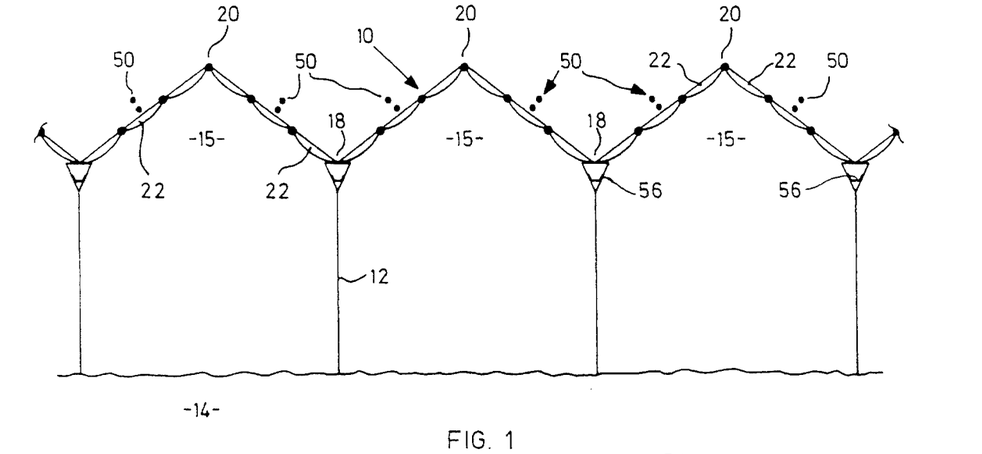
FIG. 1 is an end elevation of a roof structure.

Referring therefore to FIG. 1, a roof 10 is supported on vertical posts 12 to cover a crop growing area 14. The roof 10 includes spaced parallel rafter assemblies 16 that extend from one side of the crop growing area 14 to the other and are supported on the post 12.

The roof 10 is formed as a series of gables 15 with valleys 18 alternating with peaks 20. The number of gables will vary depending upon the width of the area 14 and may terminate either at a valley or peak depending upon the installation. It is, however, more usual to terminate at a valley 18.

Figure 4:
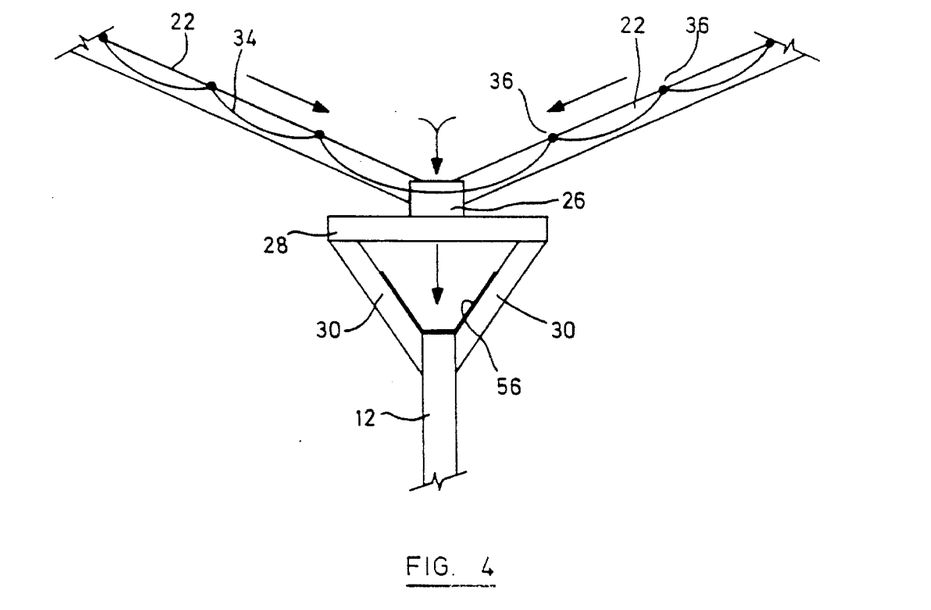
FIG. 4 an end view of the portion of the roof structure shown in FIG. 3.

The rafter assemblies 16 define the gables 15 and thus the valleys 18 and peaks 20. Each rafter assembly 16 includes pairs of oppositely directed rafters 22 extending from adjacent the valleys 18 to the peak 20 to define gable 15. The rafters 22 are connected to the posts 12 in the valleys 18 to define the rafter assembly 16. Each of the rafters 22 is formed from a structural square section tubing, typically of galvanized steel tubing, and is connected in the valley 18 to a bracket 26 by pins 24. The bracket 26 extends upwardly from a horizontal support member 28 which in turn is supported by a pair of inclined members 30 that extend from the opposite ends of the support member 28 to the top of the post 12. A triangular aperture is thus formed between the support member and the inclined members 30 at the top of the post with the rafters 22 being supported above the post 12. The distal end of the rafters 22 at the peak 20 are similarly connected through pins and brackets to the adjacent rafter. The rafter assembly shown utilizes a pair of rafters but in some applications a truss may be used for the rafter or additional posts 12 may be provided at the peak 20 for structural support. The exact form of rafter assembly will be determined by the design loads.

Figure 5:
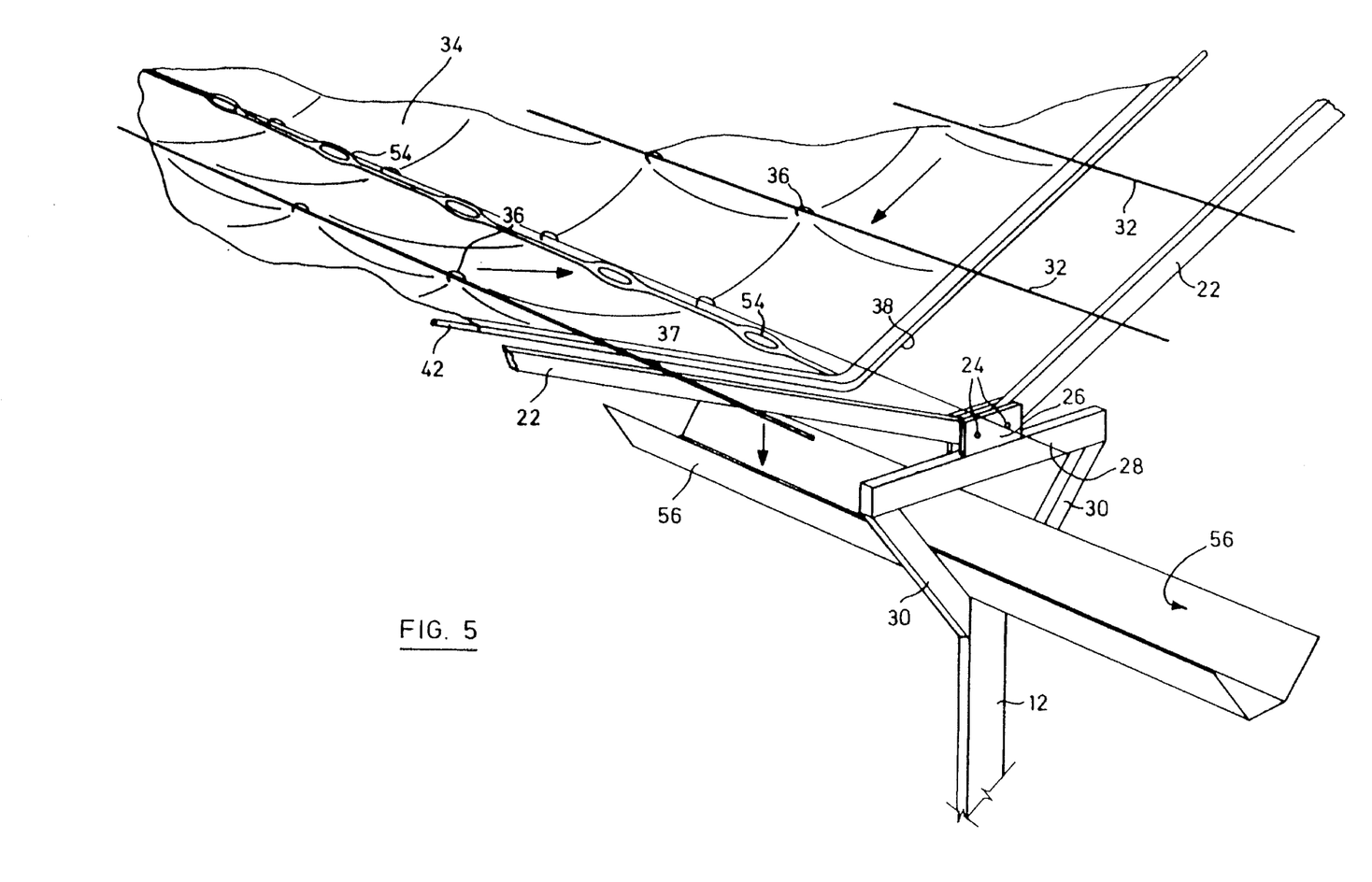
FIG. 5 is a perspective view of a portion of the roof structure shown in FIGS. 1–4.
Figure 6:
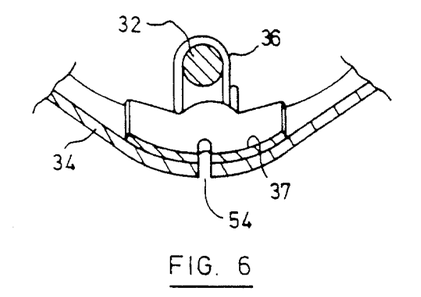
FIG. 6 is a view on an enlarged scale on the line 6—6 of FIG. 3.

Each of the rafters 22 supports a series of guidewires 32 that extend perpendicular to the rafter assembly 16 and generally parallel to one another. The guidewires 32 are secured to each of the rafters 22 at spaced locations and are pretensioned so as to be able to support a predetermined load. As can best be seen in FIG. 2, the guidewires 32 are uniformly spaced along the rafters 22 between the peaks 20 with one of the guidewires 32 being located at the peak 20 at the connection between adjacent rafters 22. It will also be noted from FIGS. 5 and 6 that a guidewire 32 is provided at the valley 18 as well as to either side of the valley 18. The guidewires 32 may be attached to the rafters 22 by any convenient manner such that relative movement between adjacent rafters is opposed by the guidewires. For example, a plate may be welded to the rafter 22 and a complementary plate bolted to it so that the guidewire 32 may be trapped between the plates after it is pretensioned. Alternatively, where the design of rafter 22 permits, a U bolt may be inserted into the rafter so that the guidewire is trapped between the bight of the bolt and the rafter. As a further alternative, the rafter 22 may be drilled so that guidewires 32 pass through the rafters 22 and a cable clamp applied to the guidewire 32 on either side of the rafter 22 to inhibit relative movement between the rafter 22 and guidewire 32. In each case, the guidewire provides supports for the rafter assembly and so acts in a manner similar to the purlins used in a conventional glazed greenhouse structure.

The guidewires 32 support sections of a flexible roof membrane indicated generally at 34 which is typically formed from a fabric having the required characteristics to control the environment in the crop growing area 14. A suitable fabric is Fabrene TGNN available from Fabrene Inc., North Bay, Ontario, Canada, which is impermeable to water but allows the transmission of light to the growing area 14. As shown in detail in FIG. 6, the membrane 34 is attached to the guidewires 32 by hooks 36 which are secured in tapes 37 sewn to the membrane 34 and are free to slide along the wire 32. The nature of the hooks and their attachment to the wire and to the membrane is well known and need not be described further at this time. It should, however, be noted that a tape 37 extends along the valley 18 to receive hooks 36 and provide support at the valley. It is, however, possible that the tape 37 and guide wire 32 in the valley 18 could be omitted in certain conditions. For example, certain fabrics will not pleat properly in the valley due to the extra stiffness provided by the tape.

The membrane 34 includes a leading edge 38 and a trailing edge 40 which, with the membrane deployed, abut adjacent rafter assemblies 16 to cover the area between the rafter assemblies. The trailing edge 40 is secured to its rafter assembly 16 and the leading edge 38 is formed to provide a seal when it is abutting its respective rafter assembly. As can be seen from FIG. 5, the leading edge 38 also includes a rigid tube 42 that conforms to the shape of the rafters 22 and so defines the profile of the leading edge 38 of the roof membrane 34. This ensures that a snug fit is obtained between the rafters 22 and the leading edge 38.

Figure 7:
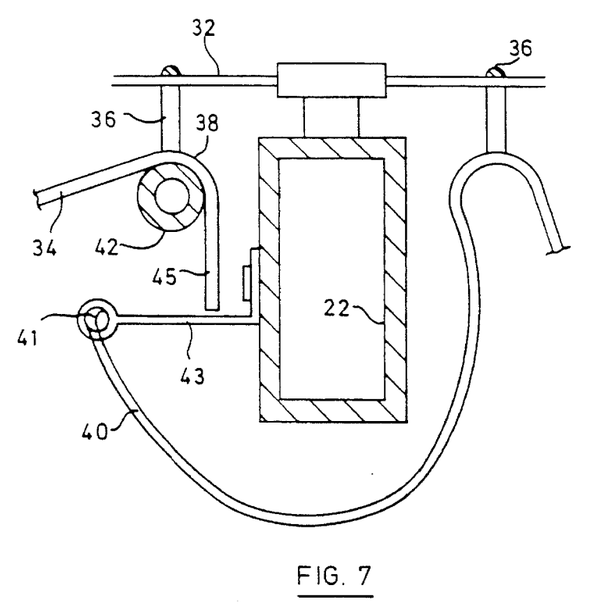
FIG. 7 is a view on the line 7—7 of FIG. 2.

As seen in FIG. 7, the trailing edge 40 of the membrane 34 passes beneath the rafter 22 and is secured to a support wire 41. The wire 41 is set off from the rafter 22 by brackets 43. When deployed, the leading edge 38 of the adjacent membrane 34 overlaps the trailing edge 40 and has a flap 45 extending down toward the brackets 43. In this way, a continuous seal is provided along the rafters 22 when the membrane is deployed and water running off the leading edge 38 will be collected in the trough formed beneath the rafter 22 by the trailing edge 40.

As noted above, the membrane 34 is free to slide along with the guidewires 32 between a retracted position in which the leading edge 38 is brought close to the trailing edge 40 and a deployed position in which the leading edge extends to the adjacent rafter assembly 16 and the membrane 34 covers the crop growing area 14. In the retracted position, the roof membrane 34 assumes a folded or pleated configuration which will progressively unfold one pleat at a time as the membrane 34 is moved to the deployed position. In the deployed position, the membrane will be generally fully extended. Although the membrane 34 will generally be taut to inhibit flapping of the material, troughs running parallel to the rafters 22 will be formed between the locations at which the membrane 34 is secured to the cables 32. It will also be understood that the areas between adjacent pairs of rafter assemblies 16 each have their respective sections of membrane 34 so that one section of membrane extends across the width of the roof 10 between adjacent rafter assemblies 16 but the whole area is covered by several sections of the roof membrane 34.

The membranes 34 may be moved between retracted and deployed positions by various means, including manually sliding along the guidewires 32, but it is preferred to provide for a mechanized movement. In this regard, a motorized drum 46 adjacent that drives an endless loop cable 50 having upper and lower runs that extend from the drum 46 around a pulley 48 and back to the drum 46. The lower run of the loop 50 is secured as indicated at 52 to the leading edge 38 of each of the membranes 34 so that the leading edge 38 moves with the lower run of the cable 50. Thus, upon rotation of the drum 46 in one direction or the other, the cable 50 can be used to move the membranes 34 between retracted and deployed positions with each of the membranes 34 being moved in unison. Again, the details of such drives are known and need not be described further at this time.

It will be noted that the membrane 34 extends continuously from peak 20 through the valley 18 to the next peak 20. Ideally, to maximize heat retention and provide uniform growing conditions, a single membrane will extend from one side of the growing area 14 to the other side as a continuous membrane although for practical purposes it may be necessary to cover the area between adjacent rafter assemblies 16 in several sections. To avoid the accumulation of water in the valleys 18, the membrane 34 is formed with apertures 54 in the portion of the membrane 34 that passes through the valley 18. An aperture 54 is provided between each of the locations at which the hooks 36 secure the membrane 34 to the wires 32 so as to be centrally located with respect to the troughs formed in the deployed position.

Apertures 54 are formed in the preferred embodiment as a single slit in the membrane extending parallel to and along the valley 18. To inhibit tearing of the membrane, the slit forming the aperture 54 is located in the body of the tape 37. Tape 37 is typically woven and has greater tear strength in both lateral and longitudinal directions than the material forming the membrane 34. The tape 37 thus provides a local reinforcement for the membrane 34 around the apertures 54.

The formation of the apertures 54 as a slit also inhibits the air flow through the aperture 54. The edges defining the slit will tend to abut one another when the membrane 34 is deployed and so form an effective seal. However, when water accumulates in the valley 18, the edges of the slit will be forced apart to allow water to pass through the aperture 54. Typically the slits are in the order of 4 inches long with a span between hooks 36 of 16 inches. This has been found adequate to accommodate heavy rainfall but extreme climatic conditions may dictate larger apertures.

Figures 2, 2A:
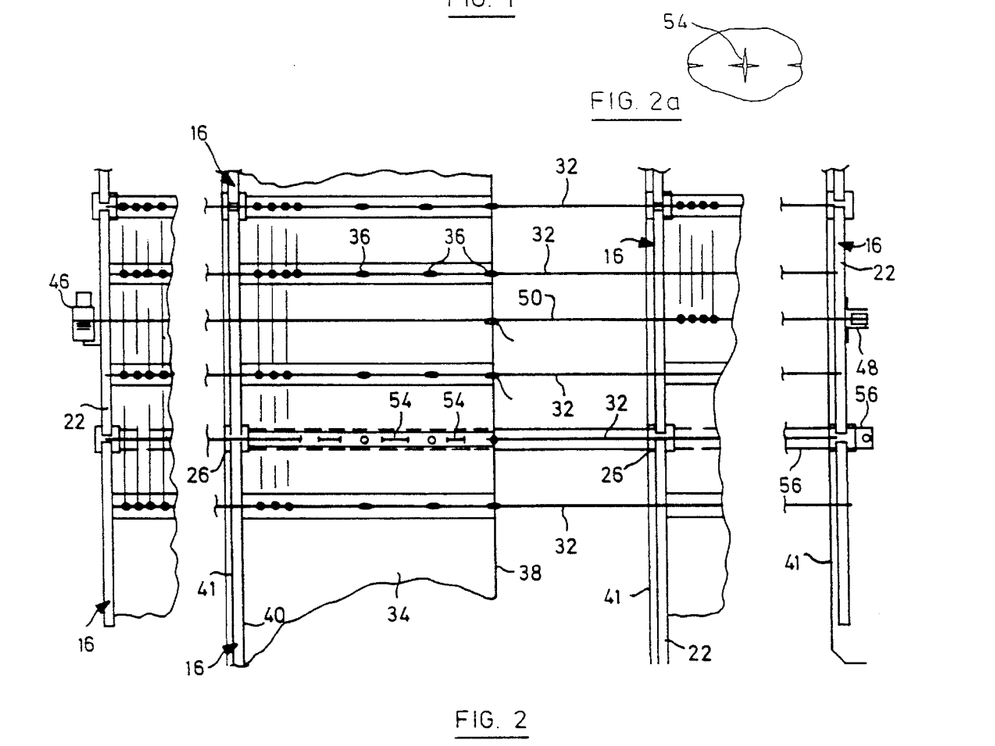
Figure 3:
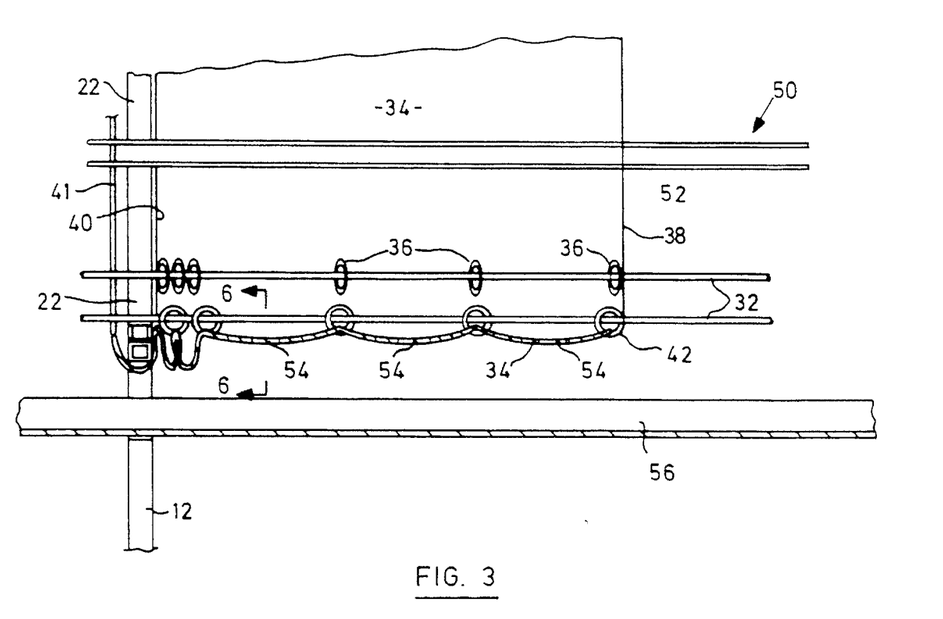
FIG. 3 is a section on the line 3—3 of FIG. 2.

In certain conditions, it may be preferable as shown in FIG. 2a, to provide the aperture as a pair of intersecting slits so that a larger aperture is provided. This can then accommodate occasional debris such as leaves that otherwise might block the aperture.

The apertures 54 are aligned with the lowest point of the valley 18 so as to be centred above the posts 12. To collect water passing through the apertures 54, a gutter 56 is supported on the post 12 between the inclined members 30. The gutter 56 extends from one end of the roof to the other beneath each of the rafter assemblies 16 and collects water passing through the apertures 54. The gutter extends to the end of the building where the water is discharged through a down pipe 58. To facilitate drainage, the posts 12 are adjusted vertically so a constant fall is provided from one end of the roof to the other allowing the water in the gutter 56 to drain effectively to the down pipe 56. The gutter 56 is formed from a rigid extrusion such as aluminum steel or plastics material. Of course, the gutter 56 may be interrupted along the length of the building to provide down spouts 58 at regular intervals which can then discharge into ground water collection channels if necessary.

The membrane 34 thus provides a climate protection for the ground covering area 14 which is impermeable to water and therefore protects the crop growing area 14 from heavy rain and potential washout. During rain, the water will flow in the troughs that will be formed between the fastening of the membrane 34 to the guidewires 32 and will flow through the aperture 54 into the gutter 56. However, the membrane 34 may be retracted under favourable climatic conditions to avoid the excessive heat gain normally associated with closed structures, or may be deployed during parts of the day to provide the shade required for crops in the growing area 14. The provision of the apertures 54 and the gutter 56 supported on the post 12 provides an effective drainage system for water shed by the roof and thereby permits an impermeable membrane to be used and avoids damage to the crops or excessive loads being imposed on the roof.

If preferred, a plurality of membranes 34 can be secured between the adjacent rafters 16 and successively deployed in a manner taught in our co-pending application Ser. No. 07/818,073 filed Jan. 8, 1992 so that an appropriate climate control can be provided to the crop growing area 14 as desired. If inclement weather is forecast, it is simply necessary to deploy the impermeable membrane 34 to prevent excess rain being provided to the crop growing area 14. The provision of the apertures 54 and gutters 56 may also be beneficial if permeable material is used, as the pitched roof will tend to shed water in heavy rainfall. Thus the gutter will prevent damage to the crop and roof structure.

Figure 8:
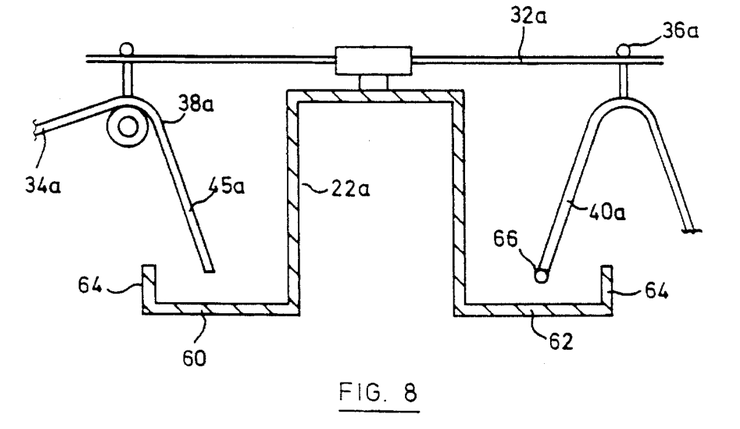
FIG. 8 is a view similar to FIG. 7 of an alternative embodiment.

The overlapping of the leading and trailing edges 38,40 described above is feasible where a single rafter 22 is used. However, where a truss is used as the rafter assembly 16, it is not practical to pass the membrane 34 beneath the rafter. In this case, the arrangement shown in FIG. 8 may be used. In the embodiment of FIG. 8, like components will be identified with a like reference numeral with a suffix a added for clarity.

Rafter 22a is formed as a "top hat" section with laterally extending flanges 60,62. The edges of the flanges 60,62 are upturned, as indicated at 64, so that a rigid gutter section is formed on each side of the rafter. The flap 45a on the leading edge 38a of the membrane 34a is thus received in the gutter and the trailing edge 40a of the adjacent membrane 34a is held by a wire 66 in the gutter formed by flange 62. Thus rain will be directed by the leading and trailing edges respectively into the gutters on the rafters 22a. The gutters terminate at the valley 18a and discharge water into the gutter 56a.

Figure 9:
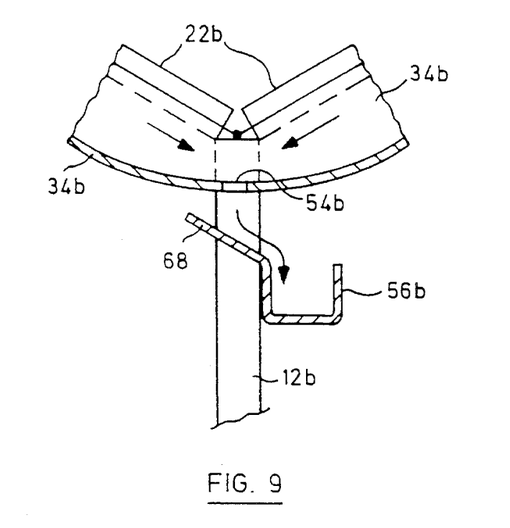
FIG. 9 is a view similar to FIG. 4 of a yet further alternative embodiment.

As shown in FIG. 9, it is also possible to offset the gutter 58b and utilize a single post 12b without inclined support members 30. Thus in the embodiment of FIG. 9, the gutter 58b is formed with a tail 68 extending across the valley 18b and under the apertures 54b so as to direct water into the gutter 56b. The tail 68b is notched around the posts 12b allowing a continuous run for the gutter 56b In each of the above embodiments, the apertures 54 are shown as a localized discontinuity in the membrane 34. However, it will be appreciated that the aperture may be formed in different ways, for example by stapling adjacent edges of membranes so that they move in unison but have apertures or discontinuities between the staples. In this way, control over the movement of air and discharge of water is retained.

Alternatively, the membrane 34 may be formed with a highly porous strip in the valley 18 that will pass water while retaining a continuous membrane. Some loss of control of the air flow may be anticipated with this arrangement.

Figure 10:
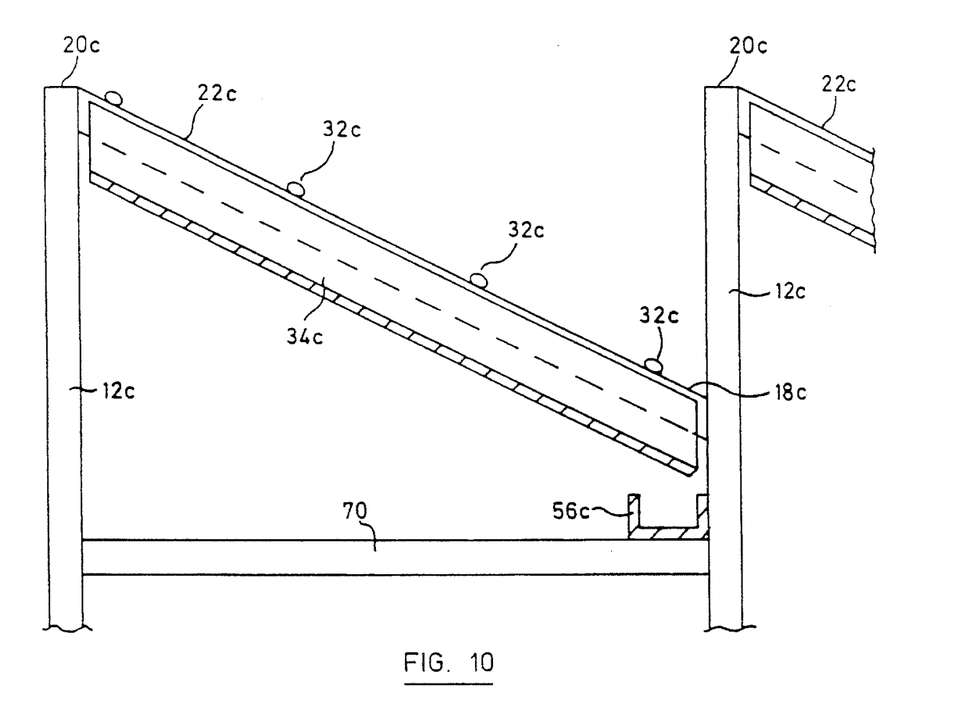
FIG. 10 is a general view, similar to FIG. 1, of a still further embodiment of a roof structure.

The general principles of rainfall control within a greenhouse environment may also be used in alternative configurations of greenhouse. FIG. 10 shows a sawtooth roof and like components will be identified with like reference numerals with a suffix "c" added for clarity. In the embodiment of FIG. 10, posts 12c support inclined rafters 22c. The rafters 22c extend from a peak 20c to a valley 18c with the post 12c extending vertically to the next peak 20c.

A roof membrane 34c is supported on each of the rafters 22c by wires 32c and may be extended or retracted as described above. The portion of the post 12c above the valley 18c is also covered with a curtain or may be glazed or louvered if appropriate.

A gutter 56c is supported on the post 12c below the lower edge of the membrane 34c so that water shed from the roof will be discharged into gutter 56c. The gutter 56c is supported on a horizontal cross member 70 at each post 12c and drains to one end as described above.

The roof structure shown in FIG. 10 thus simulates a conventional sawtooth greenhouse structure but retains the flexibility of a curtain system while controlling discharge of water from the membrane 34c by locating a gutter below the membrane in a valley 18c.

Figure 11:
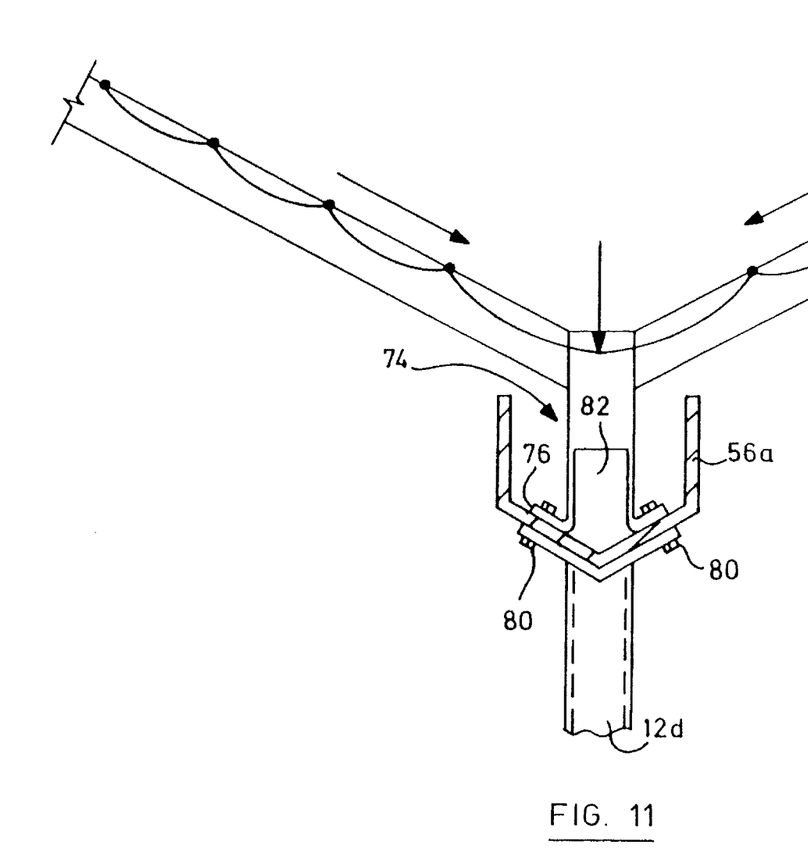
FIG. 11 is an end view similar to FIG. 4 of a further embodiment of post and rafter assembly.
Figure 12:
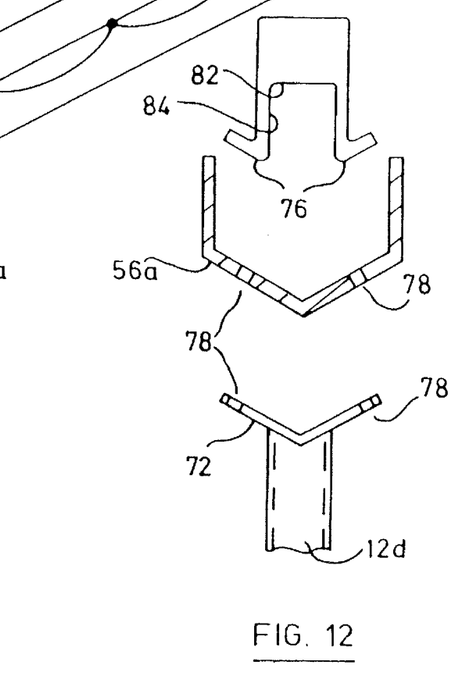
FIG. 12 is an exploded view of the components shown in FIG. 11.

A further embodiment of posts and rafter assembly is shown in FIGS. 11 and 12 in which like components to those shown in FIGS. 1 to 7 will be identified with like reference numerals with a suffix "d" added for clarity.

Referring therefore to FIGS. 11 and 12, a post 12d terminates in a saddle 72 which is welded or bolted to the post 12d. The saddle 72 is V-shaped to support a gutter 56d. A post extension 74 has a pair of out-turned feet 76 which conform to the inclination of the saddle 72. Bolt holes 78 are formed in the feet 76, gutter 56d and saddle 72 to receive bolts 80 that join the post 12d and the post extension 74.

Rafters 22d are bolted to the upper end of the post extension 74 as described above with respect to FIG. 4.

The post extension 74 is formed from square section steel tubing of similar size to the post 12d. The front and rear walls of the lower portion of the tubing are removed to provide an aperture 82 and flanks 84. The flanks 84 are bent out, as noted above, to provide the feet 76.

With the arrangement shown in FIGS. 11 and 12, the continuous gutter 56d is supported on the saddle 72 with the aperture 82 in the post extension 74 allowing water to flow along the gutter 56d. AT the same time, a rigid support for the rafters 22d is provided by the post extension in a simple yet effective manner and without undue complication.

With the arrangement of FIGS. 11 and 12, the gutter 56d is centrally disposed to collect water shed by the roof membrane and the channels 60,62 if the rafter assembly of FIG. 8 is utilized. The assembly of the structure remains simple with a minimum of components and adequately supports the gutter 56d at the requisite intervals.

I claim:

1. A retractable roof comprising a pair of spaced parallel rafter assemblies each having a pair of oppositely directed rafters diverging upwardly from a valley to a respective peak, a plurality of guide means extending between said rafter assemblies at spaced locations and including a plurality of spaced parallel wires extending generally parallel to said valley and supported by said rafters, a flexible roof membrane extending between said rafter assemblies and from one peak through said valley to an adjacent peak, said membrane being suspended from said wires of said guide means by hooks at spaced locations and movable therealong between a deployed position in which said membrane extends between said rafter assemblies to cover the area therebetween and a retracted position in which the area between said rafter assemblies is substantially uncovered, one end of said membrane being secured to one of said rafter assemblies and an opposite end being movable toward and away from the other of said rafter assemblies, said one rafter assembly including a formation extending along one side of each of said rafters of said rafter assembly to receive said one end of said membrane, said membrane including an aperture positioned centrally between each of said spaced locations in the portion of the membrane extending through said valley, and a gutter disposed beneath and adjacent to said aperture and extending along said valley to collect water shed from said membrane and passing through said aperture.

2. A roof according to claim 1 wherein said rafter assemblies are supported on posts located beneath said valley.

3. A roof according to claim 2 wherein said gutter is supported by said posts.

4. A roof according to claim 3 wherein an upper end of said post is bifurcated to receive said gutter and a support member extends between and is connected to each of said bifurcations, and said rafters are connected to said support member between the bifurcation and above said gutter.

5. A roof according to claim 1 wherein said opposite end includes a seal to engage said other of said rafter assemblies.

6. A roof according to claim 5 wherein said seal includes a rigid member conforming to the shape of said rafters between said peaks and secured to said membrane.

7. A roof according to claim 1 wherein said formation is a channel.

8. A roof according to claim 7 wherein said channel is upwardly directed and is operable to direct water into said gutter.

9. A roof according to claim 1 wherein said one end of said membrane passes beneath said one rafter assembly and is secured to the opposite side thereof.

10. A roof according to claim 9 wherein said formation extends toward an adjacent rafter assembly so as to be overlapped by the other end of a roof membrane associated with said adjacent rafter assembly when in said deployed position.

11. A roof according to claim 3, wherein said post includes a saddle at its upper end to receive and support said gutter and an extension member extends upwardly from said saddle to support said rafters, said gutter being located between said saddle and said extension member to extend laterally of said extension member with said extension member being located within said gutter.

12. A roof according to claim 11 wherein said extension member includes a pair of feet and an aperture between said feet to permit fluid to flow along said gutter from one side of said post to another.

13. A roof according to claim 12 wherein said feet are outwardly directed to opposite sides of said extension member.

14. A roof according to claim 13 wherein said saddle, gutter and feet are each configured to diverge upwardly from said post.

15. A roof according to claim 8 wherein an upwardly directed channel is provided on both sides of each of said rafters, one of which receives said one end of said membrane and the other of which receives an opposite end of a roof membrane associated with an adjacent rafter assembly when in said deployed position.

16. A roof according to claim 15 wherein each of said channels directs water into said gutter.

17. A retractable roof comprising a pair of spaced parallel rafter assemblies each having a pair of oppositely directed rafters diverging upwardly from a valley to a respective peak, a plurality of guide means extending between said rafter assemblies at spaced locations and including a plurality of spaced parallel wires extending generally parallel to said valley and supported by said rafters, a flexible roof membrane extending between said rafter assemblies and from one peak through said valley to an adjacent peak, said membrane being suspended from said wires of said guide means by hooks at spaced locations and movable therealong between a deployed position in which said membrane extends between said rafter assemblies to cover the area therebetween and a retracted position in which the area between said rafter assemblies is substantially uncovered, said membrane including an aperture formed by a pair of intersecting slits and positioned centrally between each of said spaced locations in the portion of the membrane extending through said valley, and a gutter disposed beneath and adjacent to said aperture and extending along said valley to collect water shed from said membrane and passing through said aperture.

18. A retractable roof comprising a pair of spaced parallel rafter assemblies each having a pair of oppositely directed rafters diverging upwardly from a valley to a respective peak, a plurality of guide means extending between said rafter assemblies at spaced locations and including a plurality of spaced parallel wires extending generally parallel to said valley and supported by said rafters, a flexible roof membrane extending between said rafter assemblies and from one peak through said valley to an adjacent peak, said membrane being suspended from said wires of said guide means by hooks at spaced locations and movable therealong between a deployed position in which said membrane extends between said rafter assemblies to cover the area therebetween and a retracted position in which the area between said rafter assemblies is substantially uncovered, said membrane including an aperture formed by a slit in said membrane and positioned centrally between each of said spaced locations in the portion of the membrane extending through said valley, with a tape secured to said membrane at the portion thereof extending through said valley to provide reinforcement for said slit and a gutter disposed beneath and adjacent to said aperture and extending along said valley to collect water shed from said membrane and passing through said aperture.

19. A retractable roof comprising a pair of spaced parallel rafter assemblies each having a pair of oppositely directed rafters diverging upwardly from a valley to a respective peak, a plurality of guide means extending between said rafter assemblies at spaced locations and including a plurality of spaced parallel wires extending generally parallel to said valley and supported by said rafters, a flexible roof membrane extending between said rafter assemblies and from one peak through said valley to an adjacent peak, said membrane being suspended from said wires of said guide means by hooks at spaced locations and movable therealong between a deployed position in which said membrane extends between said rafter assemblies to cover the area therebetween and a retracted position in which the area between said rafter assemblies is substantially uncovered, said membrane including an aperture formed by a porous tape extending along said valley and positioned centrally between each of said spaced locations in the portion of the membrane extending through said valley, and a gutter disposed beneath and adjacent to said aperture and extending along said valley to collect water shed from said membrane and passing through said aperture.

* * * * *